United States Patent
Zawacki

(10) Patent No.: US 9,970,618 B2
(45) Date of Patent: May 15, 2018

(54) HEADLIGHT ASSEMBLY WITH INTERCHANGABLE COMPOSITE LENS

(71) Applicant: GM GLOBAL TECHNOLOGY OPERATIONS LLC, Detroit, MI (US)

(72) Inventor: Jeffrey T. Zawacki, Oxford, MI (US)

(73) Assignee: GM Global Technology Operations LLC, Detroit, MI (US)

(*) Notice: Subject to any disclaimer, the term of this patent is extended or adjusted under 35 U.S.C. 154(b) by 6 days.

(21) Appl. No.: 15/147,413

(22) Filed: May 5, 2016

(65) Prior Publication Data
US 2017/0321859 A1 Nov. 9, 2017

(51) Int. Cl.
*F21S 8/10* (2006.01)

(52) U.S. Cl.
CPC ......... *F21S 48/1208* (2013.01); *F21S 48/115* (2013.01); *F21S 48/1225* (2013.01)

(58) Field of Classification Search
USPC .................. 362/520, 516, 509, 465, 456
See application file for complete search history.

(56) References Cited

U.S. PATENT DOCUMENTS

| | | | | |
|---|---|---|---|---|
| 2009/0122567 A1* | 5/2009 | Mochizuki | ........... | F21S 48/1159 362/509 |
| 2012/0206050 A1* | 8/2012 | Spero | ........... | B60Q 1/04 315/152 |
| 2014/0146249 A1* | 5/2014 | Holmgren | ........... | G06F 3/0421 349/12 |
| 2014/0268837 A1* | 9/2014 | Simchak | ........... | B60Q 1/12 362/465 |
| 2015/0338043 A1* | 11/2015 | Desai | ........... | F21S 48/115 362/516 |
| 2016/0084460 A1* | 3/2016 | Kolstee | ........... | B60Q 1/0035 362/516 |
| 2016/0116118 A1* | 4/2016 | Bernard | ........... | F21S 8/026 362/224 |
| 2016/0347236 A1* | 12/2016 | Yatsuda | ........... | B60Q 1/085 |
| 2017/0023200 A1* | 1/2017 | Clement | ........... | F21S 48/1172 |
| 2017/0089538 A1* | 3/2017 | Wasilewski | ........... | F21S 48/1742 |

* cited by examiner

*Primary Examiner* — Allyson Trail
(74) *Attorney, Agent, or Firm* — Quinn IP Law

(57) ABSTRACT

A lighting assembly includes a composite lens, an optical reflector housing, and a lighting source. The composite lens has a clear lens portion, an opaque lens portion, and a first attachment feature. The optical reflector housing has a second attachment feature engaged with the first attachment feature, and further has a reflective inner surface. The optical reflector housing reflects incident light internally via the reflective inner surface and directs the reflected incident light through the clear portion. The composite lens defines a lighting cavity in conjunction with the optical reflector housing when the first and second attachment features are mutually engaged. The lighting source irradiates the lighting cavity with the incident light. A stacked headlight assembly includes vertically stacked first and second headlight assemblies, each having a composite lens, optical reflector, and lighting source.

11 Claims, 3 Drawing Sheets

HEADLIGHT ASSEMBLY WITH INTERCHANGABLE COMPOSITE LENS

TECHNICAL FIELD

The disclosure relates to a headlight assembly with an interchangeable composite lens.

BACKGROUND

Vehicle light assemblies may be configured to perform a single lighting function, such as task lighting, accent lighting, and the like, or to provide several different lighting functions. For example, a headlight assembly can provide high-beam and low-beam functions in addition to separate daytime running light (DRL) and position lighting functions. The high-beams and low-beams of a headlight assembly illuminate a roadway ahead of the vehicle to enhance overall roadway visibility. The DRL function and the position lighting function of the same headlight assembly provide lighting that improves visibility of the vehicle to pedestrians and oncoming traffic. Given that designated lighting functions are typically associated with different lighting hardware, conventional light assemblies may be less than optimal in terms of component interchangeability.

SUMMARY

A lighting assembly is disclosed herein that includes a composite lens, an optical reflector housing, and a lighting source. The composite lens includes a clear lens portion, an opaque lens portion, and a first attachment feature. The optical reflector housing has a second attachment feature that is engageable with the first attachment feature, and further includes a reflective inner surface. The optical reflector housing reflects light via the reflective inner surface and directs the reflected light through the clear lens portion. The composite lens defines a lighting cavity in conjunction with the optical reflector housing when the first and second attachment features are mutually engaged. The lighting source is configured to irradiate the lighting cavity with the light.

The composite lens disclosed herein may be formed via a two-shot or other multi-shot tooling process, or alternatively via use of an inlaid film or deposition of other materials such as metallic flakes. The clear lens portion of the composite lens may be constructed from a transparent, homogenous polymer material or acrylic. The opaque lens portion may be constructed from black or chrome-plated plastic, or of the inlaid film/deposited flakes, such that a custom cosmetic appearance may be achieved at or along the periphery of the composite lens for different lighting assemblies. Similarly, the shape of the composite lens may be altered to change the appearance of the lighting assembly without altering the optical reflector housing in any way. In this manner, the disclosed assembly is intended to allow for maximum reuse of the most costly components used in the lighting assembly, i.e., the optical reflector housing and lighting source, while still offering design flexibility across different makes or models of a product.

The lighting source may include light-emitting diodes, halogen bulbs, or any other desirable source of light suitable for the application. e.g., vehicle high beams or low beams.

The lighting assembly may be stacked such that one lighting assembly is arranged vertically with respect to one or more additional lighting assemblies. For instance, a low-beam assembly may be positioned immediately above one or more high-beam assemblies in a stacked vehicle headlight application, with the same composite lens reused in each the low-beam and high-beam assemblies.

A stacked headlight assembly is also disclosed herein that includes first and second headlight assemblies, i.e., with the headlight assemblies positioned one on top of the other. Each of the first and second headlight assemblies includes a composite lens and optical reflector housing configured as set forth above.

A vehicle includes a body and a stacked lighting assembly positioned with respect to the body. The stacked lighting assembly includes first and second lighting assemblies stacked one on top of the other. Each of the first and second headlight assemblies includes the composite lens, optical reflector housing, and lighting source noted above.

The above features and advantages and other features and advantages of the present disclosure are readily apparent from the following detailed description of the best modes for carrying out the disclosure when taken in connection with the accompanying drawings.

DETAILED DESCRIPTION

Figure 1:
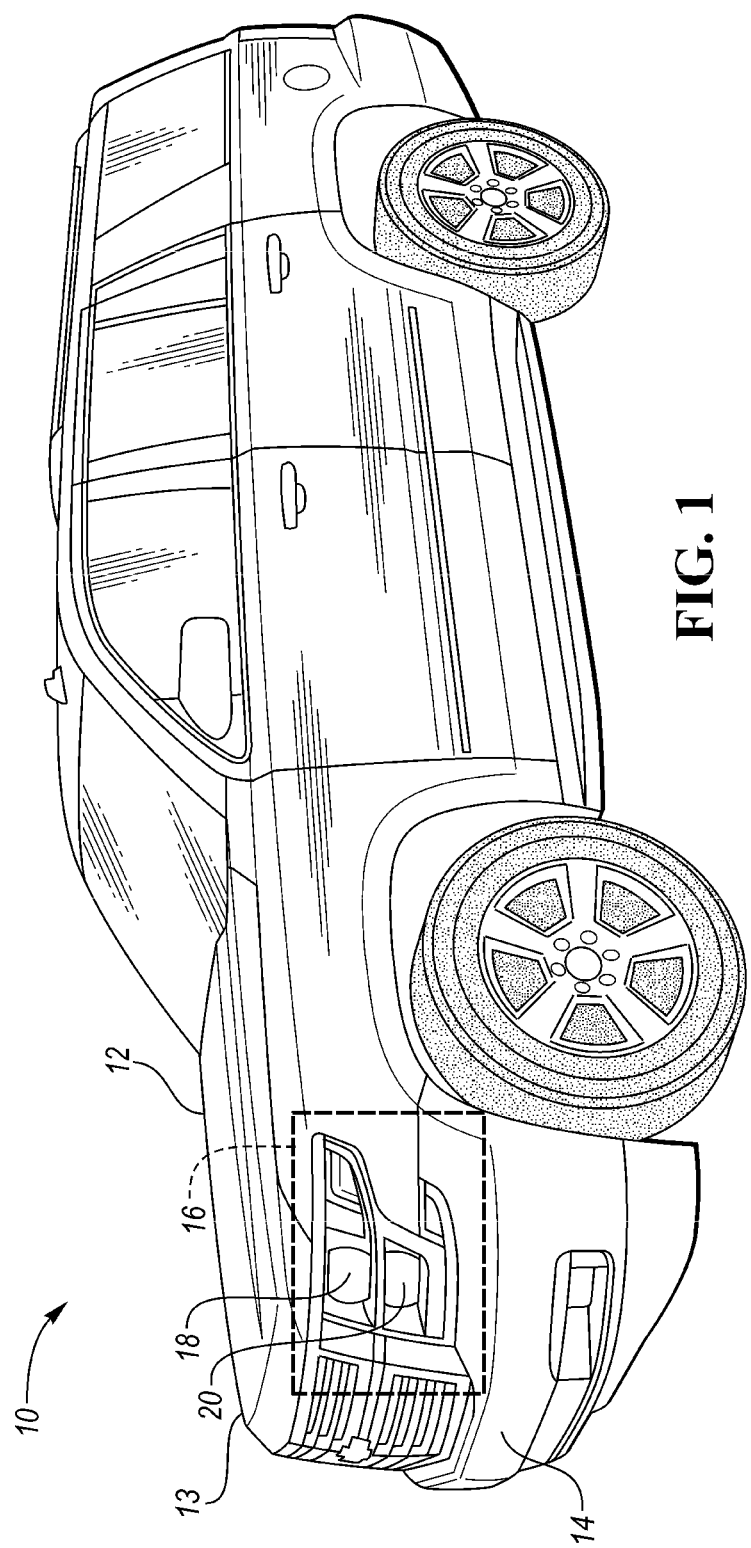
FIG. 1 is a schematic side view illustration of an example vehicle having a headlight assembly as forth herein.

Referring to the Figures, wherein like numerals indicate like parts throughout the several views, a system in the form of an example vehicle 10 having a body 12 and hood 13 is depicted schematically in FIG. 1. The vehicle 10 may include a lighting assembly 16 configured for use adjacent to the hood 13 as part of an example headlight application. For instance, the lighting assembly 16 may be positioned between the hood 13 and a front fascia piece 14 of the vehicle 10. Alternatively, the lighting assembly 16 may possibly be used at other locations of the vehicle 10, for instance in a tail light assembly (not shown) to provide backup indication or other suitable illumination.

While the vehicle 10 of FIG. 1 is a typical example application suitable for the lighting assembly 16 described herein, the present lighting assembly 16 is not limited to vehicular applications. Any stationary or mobile object requiring lighting may benefit from use of the present design, when properly scaled and configured for the particular application. That is, the lighting assembly 16 may enjoy use in various single-function or multi-function lighting applications, such as in commercial or residential buildings, display illumination, appliance illumination, accent lighting, and any other application in which the disclosed reusable configuration is desirable. For illustrative consistency, the vehicle 10 will be described hereinafter as an example system without limiting use of the lighting system 16 to such an embodiment.

In addition to housing conventional low-beam and high-beam lighting functions, with low-beam and high-beam headlights shown generally at 18 and 20 in FIG. 1, the lighting assembly 16 may be configured to also provide a position lighting function and a daytime running light (DRL)

function, all of which are well known in the art. Such functions may continue to be used with the presently disclosed light assembly, whether housed within the light assembly 16 or separately housed at an adjacent position.

Figure 2:
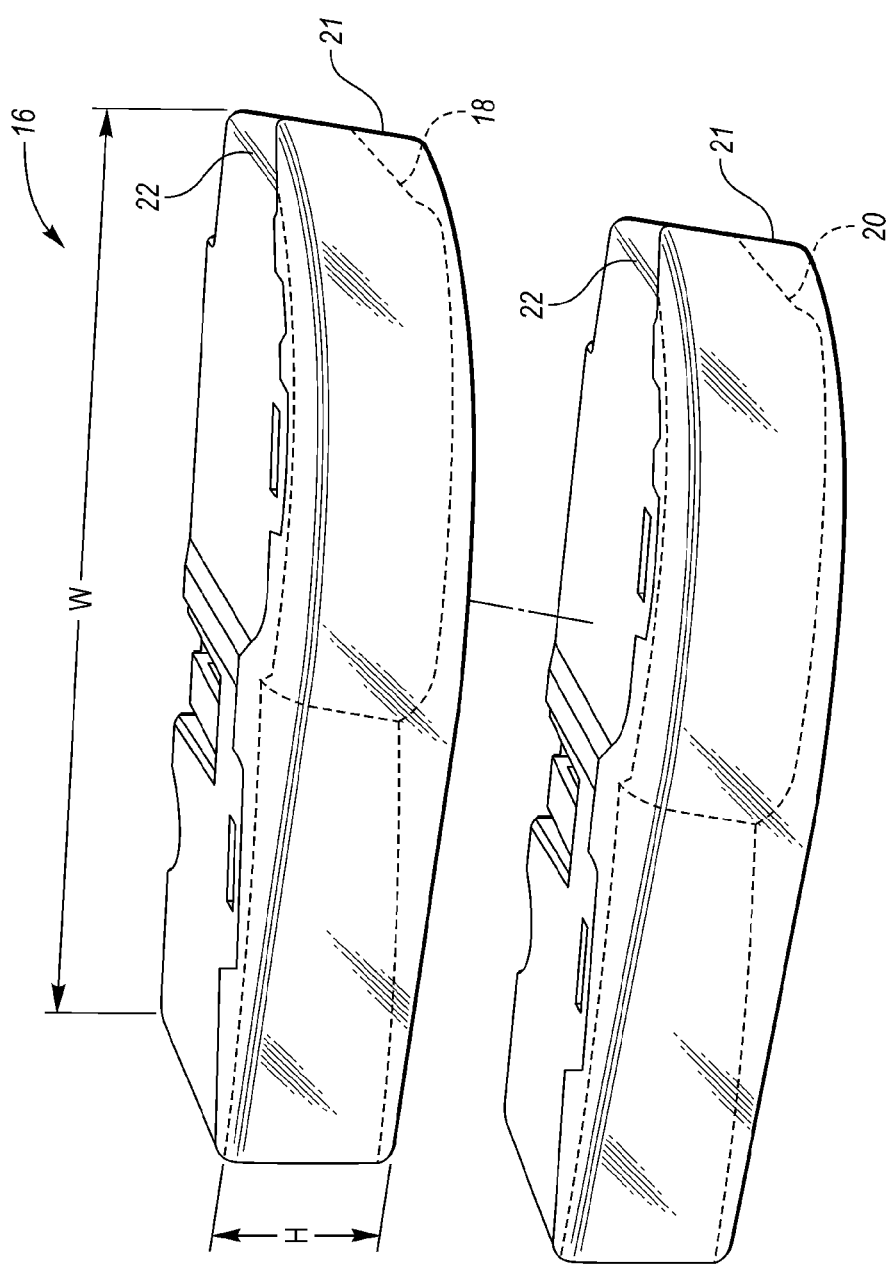
FIG. 2 is a schematic perspective view illustration of a stacked embodiment of a headlight assembly usable with the vehicle of FIG. 1.
Figure 3A:
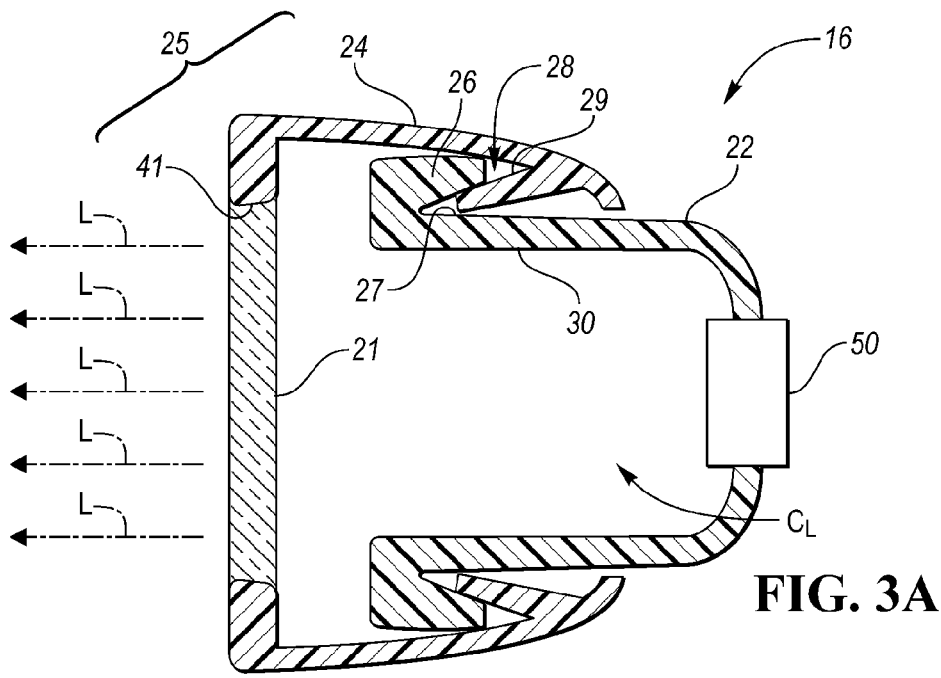
FIGS. 3A and 3B are schematic cross-sectional side view illustrations of different light assemblies that can be used in the example vehicle of FIG. 1 and in other possible lighting applications.

FIG. 2 depicts a portion of the lighting assembly 16 of FIG. 1. Specifically, the lighting assembly 16 includes a clear lens portion 21, an opaque lens portion 24 as shown in FIG. 3A and omitted from FIG. 2 for illustrative clarity, and an optical reflector housing 22. The clear lens portion 21 has a height (H) and a width (W), and is horizontally elongated as shown, i.e., the height (H) is less than the width (W). Multiple lighting assemblies 16 may be vertically stacked as shown, with the same or different lighting functions provided in each lighting assembly 16. For example, the low-beam headlight function 18 may be housed within an upper lighting assembly 16 and spanned by the clear lens portion 21, i.e., a clear lens portion 21 covers the light sources providing the low-beam headlight function 18, and the high-beam function 20 may be housed within a lower lighting assembly 16 and spanned by another of the clear lens portions 21, again with another clear lens portion 21 covering the light source(s) providing the high-beam headlight function 18. In other words, as shown in FIG. 2, a single clear lens 21 may span the light source(s) providing the low-beam headlight function 18 in the upper lighting assembly 16, while another clear lens 21 covers the light sources providing the high-beam headlight function 20 in the lower lighting assembly 16, with "upper" and "lower" in this instance referring to relative vertical orientation from the perspective of FIG. 1. While only two lighting assemblies 16 are shown in the example stacked lighting assembly shown in FIG. 2, more than two lighting assemblies 16 may be used in other embodiments to provide the desired lighting effect, e.g., with multiple high-beam functions 20. Thus, as disclosed below and depicted in FIGS. 3A and 3B, a composite lens 25 having the clear lens portion 21 can be attached to an optical reflector housing 22 in an interchangeable manner to enable reuse of the optical reflector housing.

As shown in the perspective side cross-sectional view illustration of FIG. 3A, each lighting assembly 16 includes a composite lens 25 having the clear lens portion 21 and the opaque lens portion 24, as well as a first attachment feature 29. As used herein, the term "composite" requires at least two co-molded materials of different composition, with an interface 41 defining a transition from the material of the clear lens portion 21 to that of the opaque lens portion 24. Due to their different materials, the clear lens portion 21 and the opaque lens portion 24 may be manufactured from a two-shot or three-shot molding process, as known in the art, such that the clear lens portion 21 and the opaque lens portion 24 are integrally connected together without any visible seams.

The two-shot molding process may include, by way of example, molding the clear lens portion 21 from polycarbonate or acrylic in a suitable mold (not shown). When the clear lens portion 21 has sufficiently cooled and solidified, such a mold may be adjusted and the opaque lens portion 24 may be molded onto clear lens portion 21. Other approaches may include inlaying a film, laser etching, adding metallic flake material, or otherwise forming a desired texture or appearance to the opaque lens portion 24. Then, an integral piece formed via the clear lens portion 21 and opaque lens portion 24 is connected to the optical reflector housing 22 at a peripheral bond/glue joint 28 using a two-part epoxy or other suitable material (not shown).

The optical reflector housing 22 includes a second attachment feature 26 that is engageable with the first attachment feature 29 of the composite lens 25. The composite lens 25 defines a lighting cavity ($C_L$) in conjunction with the optical reflector housing 22 when the respective first and second attachment features 29 and 26 are mutually engaged, i.e., directly engaged with each other. The optical reflector housing 22 also includes a reflective inner surface 30 such as a polished mirror or chrome plated surface. The lighting source 50 may illuminate in response to a selected lighting function, e.g., a driver of the vehicle 10 turning on or off a high-beam or low-beam function via a knob or lever (not shown). When activated, the lighting source irradiates the lighting cavity ($C_L$) with visible light, which reflects from the reflective inner surface 30 and exits the lighting cavity ($C_L$) through the clear lens portion 21 as indicated by arrows L.

The composite lens 25 of FIG. 3A includes the first attachment feature 29, which in a possible embodiment may include a foot or a tabular extension that is inserted into a recess 27 and oriented in a first direction, such as toward the clear lens portion 21. The second attachment feature 26, which is part of the optical reflector housing 22, includes another mating foot or tabular extension oriented in a second direction that is about 150-180 degrees opposite the first direction and away from the clear lens portion 21. Thus, a perimeter snap-fit configuration is provided in which the periphery of the optical reflector housing 22 engages the periphery of the opaque lens portion 24 to define the lighting cavity ($C_L$) and secure the composite lens 25 to the optical reflector housing 22.

Figure 3B:
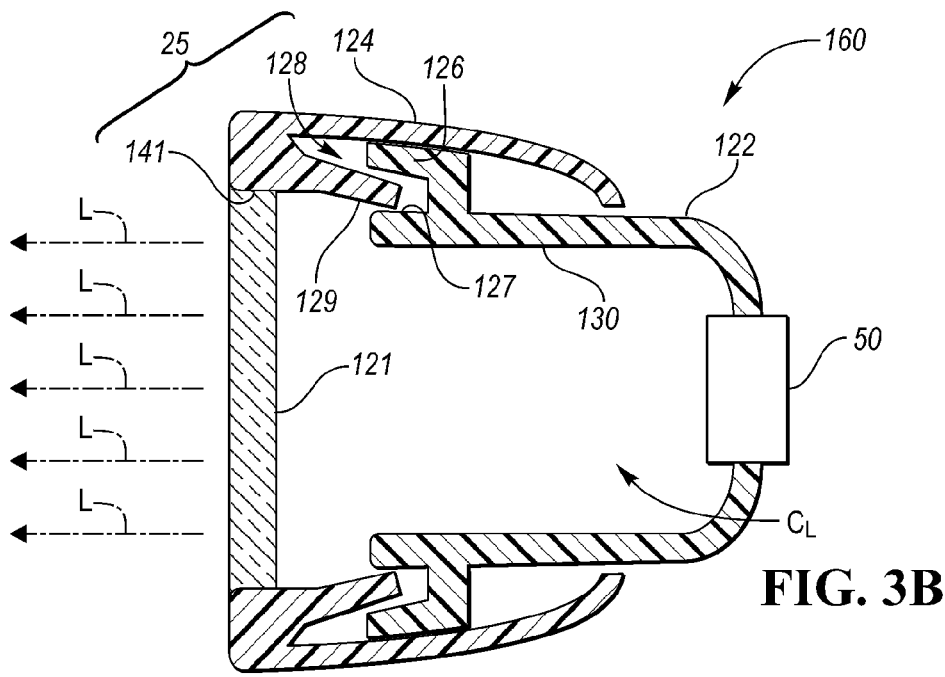

FIG. 3B depicts an alternatively configured light assembly 160 with a composite lens 125 in which the orientations of a first attachment feature 129 and a second attachment feature 126 are opposite those of the first and second attachment features 29 and 26 shown in FIG. 3A. That is, the first attachment feature 129 is oriented in a direction facing away from the clear lens portion 121 and the second attachment feature 126 is positioned in a recess 127 oriented about 150-180 degrees opposite such a direction, or toward the clear lens portion 121. In both embodiments, the clear lens portions 21 and 121 and the opaque lens portions 24 and 124 form an interface 41, 141 and may be connected to the optical reflector housing 22, 122 having a reflective inner surface 130 at a peripheral bond/glue joint 28, 128 using a two-part epoxy or other suitable material.

Therefore, the composite lens 25 described above enables various flexible applications, such as but not limited to stacked vehicle headlight applications having a low-beam function and one or more high-beam functions, to be equipped with decorative lenses attached to the optical reflector housing 22 in an interchangeable manner. Reuse of the optical reflector housing 22 across different vehicles is thus enabled, with a wide variety of configurations of the composite lens 25 being possible to offer unique styling across multiple product lines. The present approach enables customization of visual appearances around the periphery of the composite lens 25 in particular, with any snap connections of the first and second attachment features 29 and 26 effectively hidden from view.

As used herein with respect to any disclosed values or ranges, the term "about" indicates that the stated numerical value allows for slight imprecision, e.g., reasonably close to the value or nearly, such as ±10 percent of the stated values or ranges. If the imprecision provided by the term "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A stacked headlight assembly for a vehicle body, comprising:
   a first headlight assembly; and
   a second headlight assembly, wherein the first and second headlight assemblies are vertically stacked one on top of the other, configured to connect to the vehicle body, and wherein each of the first and second headlight assemblies respectively includes:
      a composite lens having a clear lens portion, an opaque lens portion that is integrally co-molded with the clear lens portion, and a first attachment feature that is integrally formed with the opaque lens portion, the clear lens portion having a height and a width that is greater than the height, and;
      an optical reflector housing having a second attachment feature that is engaged with the first attachment feature, and further having a reflective inner surface, wherein the optical reflector housing reflects incident light corresponding to the respective low-beam or high-beam function via the reflective inner surface and directs the reflected light through the clear lens portion; and
      a lighting source configured to irradiate the lighting cavity with the incident light;
   wherein the composite lens defines a lighting cavity in conjunction with the optical reflector housing when the first and second attachment features are mutually engaged.

2. The stacked headlight assembly of claim 1, wherein the opaque lens portion of the composite lens includes an inlaid film.

3. The stacked headlight assembly of claim 1, wherein the opaque lens portion is constructed from black or chrome-plated plastic.

4. The stacked headlight assembly of claim 1, wherein the lighting source includes a plurality of light-emitting diodes.

5. The stacked headlight assembly of claim 1, wherein the first attachment feature includes a tabular extension oriented in a first direction, and the second attachment feature includes a tabular extension oriented in a second direction that is 150-180 degrees opposite the first direction.

6. A vehicle comprising:
   a body; and
   a vertically-stacked lighting assembly positioned with respect to the body, including:
      a first lighting assembly that houses a low-beam lighting function; and
      a second lighting assembly that houses a high-beam lighting function, wherein the first and second headlight assemblies are vertically stacked one on top of the other, and wherein each of the first and second headlight assemblies respectively includes:
         a composite lens having a clear lens portion, an opaque lens portion integrally co-molded with the clear lens portion, and a first attachment feature, the clear lens portion having a height and a width that is greater than the height, and;
         an optical reflector housing having a second attachment feature engaged with the first attachment feature, and further having a reflective inner surface configured to reflect incident light corresponding to the respective low-beam or high-beam function and direct the reflected incident light through the clear lens portion; and
         a lighting source configured to irradiate the lighting cavity with the incident light;
      wherein the composite lens defines a lighting cavity in conjunction with the optical reflector housing when the first and second attachment features are engaged with each other.

7. The vehicle of claim 6, wherein the opaque lens portion of the composite lens includes an inlaid film.

8. The vehicle of claim 6, wherein the opaque lens portion is constructed from black or chrome-plated plastic.

9. The vehicle of claim 6, wherein the lighting source includes a plurality of light-emitting diodes.

10. The vehicle of claim 6, wherein the lighting assembly includes first and second lighting assemblies that are vertically stacked with respect to each other.

11. The vehicle of claim 6, wherein the first attachment feature includes a tabular extension oriented in a first direction, and the second attachment features includes a tabular extension oriented in a second direction that is 150-180 degrees opposite the first direction.

* * * * *